(12) United States Patent
Dickie et al.

(10) Patent No.: US 6,643,687 B1
(45) Date of Patent: Nov. 4, 2003

(54) EMAIL SYSTEM DELIVERS EMAIL MESSAGE TO A PROXY EMAIL ADDRESS THAT CORRESPONDS TO A SENDER AND RECIPIENT PAIRING

(75) Inventors: Garth A. Dickie, Arlington, MA (US); Eric C. Peters, Carlisle, MA (US); Peter J. Fasciano, Natick, MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/545,705

(22) Filed: Apr. 7, 2000

(51) Int. Cl.[7] .................... G06F 15/16; G06F 15/173
(52) U.S. Cl. .................... 709/206; 709/206; 709/238; 713/201
(58) Field of Search ................ 709/206, 238, 709/227, 207, 239, 240, 241, 242, 243, 244; 705/74; 379/201.08

(56) References Cited

U.S. PATENT DOCUMENTS

| | | | | |
|---|---|---|---|---|
| 5,815,664 A | * | 9/1998 | Asano | 709/227 |
| 5,822,526 A | * | 10/1998 | Waskiewicz | 709/206 |
| 6,230,188 B1 | * | 5/2001 | Marcus | 709/206 |
| 6,459,782 B1 | * | 10/2002 | Bedrosian et al. | 379/201.08 |
| 2001/0044785 A1 | * | 11/2001 | Stolfo et al. | 705/74 |

* cited by examiner

Primary Examiner—Le Hien Luu
(74) Attorney, Agent, or Firm—Peter J. Gordon

(57) ABSTRACT

The present invention advantageously provides for an email system that implements proxy email addresses to control access to a recipient's email mailbox, and eliminates the requirement of a sender of email to know the recipient's private email address when sending mail. A user interface is presented to a user of the email system that corresponds to permissible email exchanges.

8 Claims, 4 Drawing Sheets

EMAIL SYSTEM DELIVERS EMAIL MESSAGE TO A PROXY EMAIL ADDRESS THAT CORRESPONDS TO A SENDER AND RECIPIENT PAIRING

FIELD OF TECHNOLOGY

The present invention relates in general to an email system for sending electronic messages over computer networks, and more specifically to an email system utilizing proxy email addresses to identify particular email relationships between the sender and recipient.

BACKGROUND OF THE INVENTION

Conventional email systems are known. These systems operate on the assumption that each user of the email system has a private email address and all mail to be directed to an individual is addressed to this email address. This architecture, however, makes it difficult for an email recipient to organize incoming email messages into subject or organizational categories. Since all email for an individual is directed to a single email address, there is no way to automatically filter the mail unless the sender manually incorporates an identifier into the email message or header. The success of this method is thus dependent upon the response of the sender. A failure to manually include the requisite information defeats the intended functionality.

It is also an important security issue in the operation of an email system that the stated sender of the email message is the actual sender of the email. Any ability to "spoof" or disguise the sender compromises the integrity of the email system, which may have severe consequences. It is thus very desirable to eliminate or at least minimize any ability to present a false sender email address to a recipient.

It is also inherent in the conventional email architecture that the sender must know and provide the recipient's private email address in order to send a message. Typically, for practical reasons the email address of a recipient is not necessarily intuitive, and may require the sender to look up the address in a directory. This, of course, requires an additional effort by the sender to send email, and it would be desirable to avoid any such necessity.

It would thus be desirable to provide an email system that facilitates the automatic filtering of email messages for a recipient so that the recipient can readily organize them according to a desired grouping. Furthermore, access to a recipient's email mailbox could be denied if the sender did not adhere to the predetermined groupings of the recipient.

It would be further desirable to provide a convenient interface for sending email to a recipient without requiring specific knowledge of the recipient's private email address.

SUMMARY OF THE INVENTION

The present invention advantageously provides for an email system that implements proxy email addresses to control access to a recipient's email mailbox, and eliminates the requirement of a sender of email to know the recipient's private email address when sending mail.

In one aspect of the invention, a user interface is presented to a user of the email system that corresponds to permissible email exchanges. The user interface that is presented may be particular to the individual user. The user interface may represent a defined relationship between the email participants identified in the user interface. Email recipients may be included in multiple, user interfaces corresponding to different roles an individual may hold. For example, the user interface may be implemented in a hierarchical tree structure that identifies all the members of a work project, and facilitates email exchanges between the members of the project. Since the project members of one project may also be members of a second project, these individuals will be included in two user interfaces or two hierarchical trees for sending email to other project members.

In a further aspect of the invention, email exchanges are performed through a proxy email address to identify the recipient of the email. The proxy email address corresponds to the particular user interface that identifies the email exchange, and may be different for different user interfaces.

In a yet further aspect of the invention, the proxy email address is converted to the recipient's private email address prior to delivering the email message to the recipient. Additional information may be added to the email message by the email system that is related to the proxy address used to initiate the email exchange. The additional information related to the proxy email address provides an indication to the recipient of the email's subject or general focus.

In a still further aspect of the invention, the email system may substitute a proxy email address as the return address for a sender of email in order to identify the subject matter or focus of the reply.

In a further aspect of the invention, the ability to exchange email relating to a certain matter may be eliminated by deleting the proxy email address, and thus the invention provides a convenient and efficient manner of restricting the email exchange process.

In a yet further aspect of the invention, the security of the sender and recipient email addresses is enhanced since the email system generates the sender and recipient email addresses, and thus minimizes the ability to "spoof" or present a false email address to the recipient

BRIEF DESCRIPTION OF THE DRAWINGS

For a better understanding of the present invention, together with other and further objects, advantages and capabilities thereof, reference is made to the accompanying drawings, in which.

DETAILED DESCRIPTION

Figure 1:
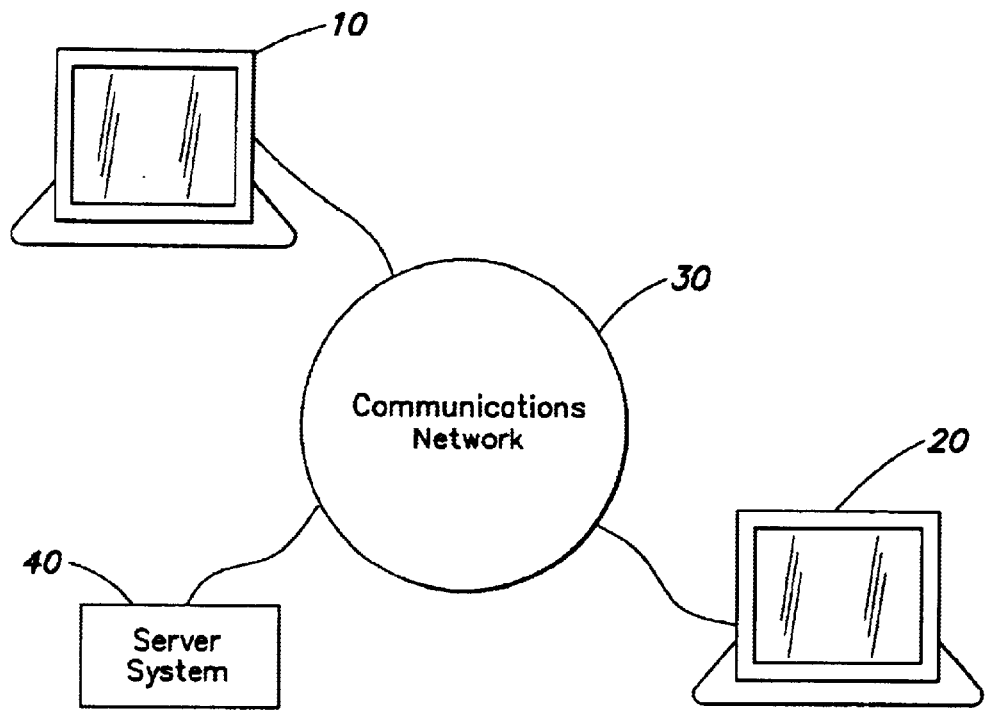
FIG. 1 depicts a schematic of the environment in which the present invention operates.

Referring now to FIG. 1 there is shown in schematic form the environment in which the present invention operates. Client system 10 and client system 20 are two computer systems that have the ability to transmit messages between each other over a communications network 30. Client system 10 and client system 20 are typically a personal computer (PC), but may also be a workstation, minicomputer, mainframe computer, or other devices such as a Palm Pilot, a specialized email appliance, Web TV, pagers, and cell phones. One of ordinary skill in the art will clearly recognize that the present invention is not restricted to a specific computer system and is applicable to many different processor configurations. Communications network 30 may be a Local Area Network (LAN), such as an Ethernet network, a Wide Area Network (WAN), such as a packet switching network, a dial-up connection to the Internet, or a wireless connection. Communication network 30 may also be a combination of a LAN and WAN, and may be the Internet. The present invention does not require a specific communication network 30 to practice the invention, and those of ordinary skill in the art will recognize that many communication configurations are applicable to the invention. Server system 40 connects to communication network 30, and is capable of communicating with client system 10 and client system 20 through communication network 30. Client system 10 and client system 20 typically make requests to server system 40, and the server system 40 responds to the request by communicating back to the client system through the communication network 30. The client system 10, client system 20, and server system 40 conform to the "client/server" architecture. The foregoing discussion has been limited to only two client systems and one server system for the sake of simplicity and clarity, but one of ordinary skill in the art will clearly recognize that the environment in which the present invention operates is not so limited. For simplicity, the invention herein will be described in relation to two client systems and one server system, but again the invention is not so limited. Communication network 30 may provide a communication connection between a large number of client systems and server systems, and is only limited by performance considerations as is well known in the art. The present invention is thus applicable to many client systems and server systems on a shared communication net 30.

Figure 2:
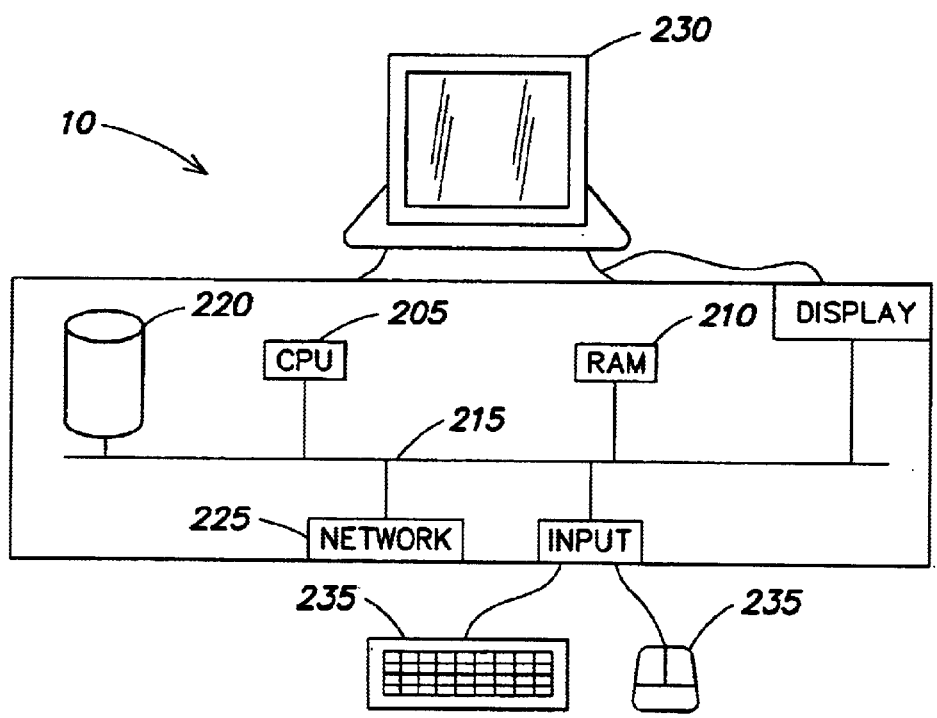
FIG. 2 depicts a computer system as embodied by the client systems or server systems, according to the invention.

FIG. 2 shows a typical computer system as embodied by client system 10, client system 20, or server system 40. For illustrative purposes, client system 10 will be described, but the following description is also applicable to client system 20 and server system 40. Server system 40 may have better performance characteristics than the client systems, due to a faster processor and a larger storage element or the like, but generally server system 40 includes similar computer components and peripherals as the client systems.

Client system 10 includes a computer processing unit (CPU) 205 for executing computer instructions, and a random access memory (RAM) 210 for storing computer instructions and digital data. CPU 205 communicates with RAM 210 via communication bus 215. A storage element 220 for storing non-volatile digital data also connects to communication bus 215. Communication bus 215 also allows communication of messages and data between storage element 220 and CPU 205 or RAM 210. Client system 10 further includes a network port 225 for communicating messages and data over communications network 30, and an input device 235, such as a keyboard for keying in data, or a pointer device, such as a mouse for entering information into client system 10. Client system 10 may also include a display device 230, such as a display monitor, for displaying information. Display device 230 is also coupled to the communication's bus 215 for receiving and displaying information from the other components of client system 10.

Figure 3:
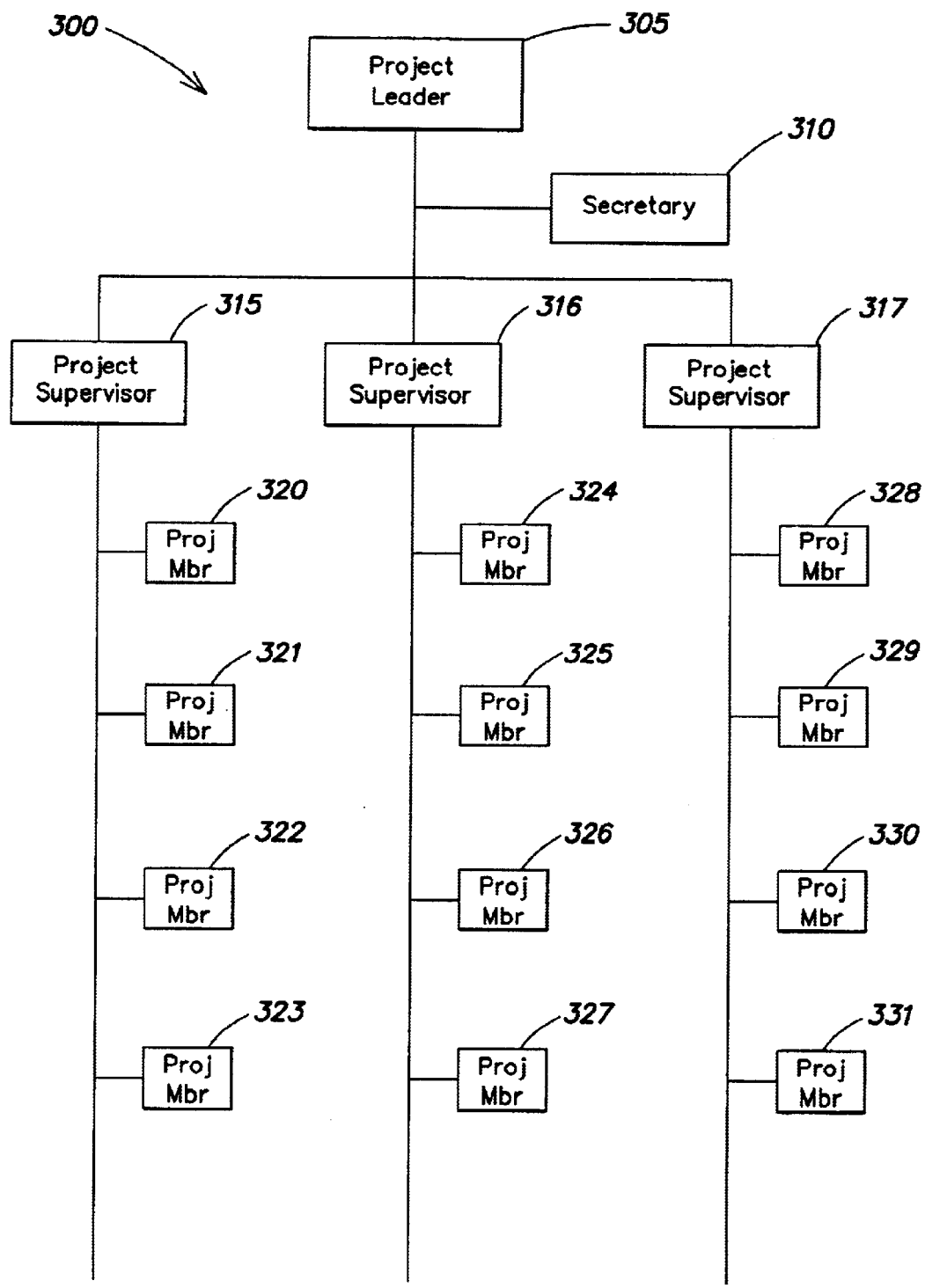
FIG. 3 shows a user interface (UI) 300, according to the invention, which is incorporated into an email system for sending email to a selected recipient.

Client system 10 executes computer software including computer instructions for implementing, in the preferred embodiment of the invention, a messaging system. The messaging system permits messages (email) to be sent from client system 10 to client system 20. Conventional email systems are known. They allow a sender to send electronic messages to another computer user, the recipient. Typically, the sender addresses a message for the recipient to an electronic mailbox, an email address such as userid@mailsystem.ext, which defines a unique address in the communications network. In this syntax, userid is an identifier for the recipient, and mailsystem.ext is the domain in which the recipient receives his or her mail. FIG. 3 shows a user interface (UI) 300, according to the invention, which is incorporated into an email system for sending email to a selected recipient. UI 300 is displayed on display device 230 of client system 10, and may be a graphical user interface. However, the invention is clearly not limited to only a graphical interface. UI 300 lists email recipients that a particular individual may send mail to. The list of email recipients that is presented corresponds to the particular sender of the email, and may be customized for each email sender. The list of recipients may be organized according to project or department membership, and may exclude certain members of an organization. Because an email sender or recipient may be a member of more than one project, the sender and/or the recipient may be represented in multiple email lists. The sender has, therefor, the ability to select the appropriate list to send email to the recipient. In the preferred embodiment of the invention, the list of email users as shown in UI 300 is presented in a hierarchical manner. While a hierarchical ordering is very natural for displaying organization charts and the like, it will be appreciated by those of ordinary skill in the art that other ordering schemes can be implemented, and remain within the scope of the invention.

Still referring to FIG. 3, a hierarchical list of email recipients is presented. UI 300 depicts the organization of a particular project. UI 300 depicts a project leader object 305, having a secretary identified by object 310, and three (3) project supervisors identified by objects 315, 316, and 317. Each of the project supervisors identified by objects 315, 316 and 317 supervises four (4) project members, which are identified by objects 320 through 331.

Having described the UI 300 for sending email to a recipient, the process of sending email will now be described, while still referring to FIG. 3. If a project member identified by object 325 wants to send an email to the project leader, the project member invokes UI 300 and selects object 305 identifying project leader as the intended recipient of the email. The selection may be performed using the mouse or pointing device as the input device 235. For purposes of example and for describing the present invention, it will be assumed that the sender of the email, the project member, resides at client system 10 and the recipient of the email, the project leader, resides at client system 20. Consequently, an email is created at client system 10 for delivery to client system 20. Having selected the intended recipient, the sender is now presented at client system 10, a user interface for entering the message to be sent to the recipient. Since user interfaces for entering email messages are well known in the art, a description of this interface is not needed and will not be described herein. This description will focus rather on other aspects of the invention. The sender of the email message enters the message using a keyboard as the input device 235 and sends the email message to the recipient.

In the described process for sending an email message, it should be noted that the sender of the message did not have to know the email address of the recipient in order to address the message. The email system of the present invention determined the proper email address of the recipient from UI 300, thus relieving the sender of this requirement. The process by which the email system determines this address is now described.

Figure 4:
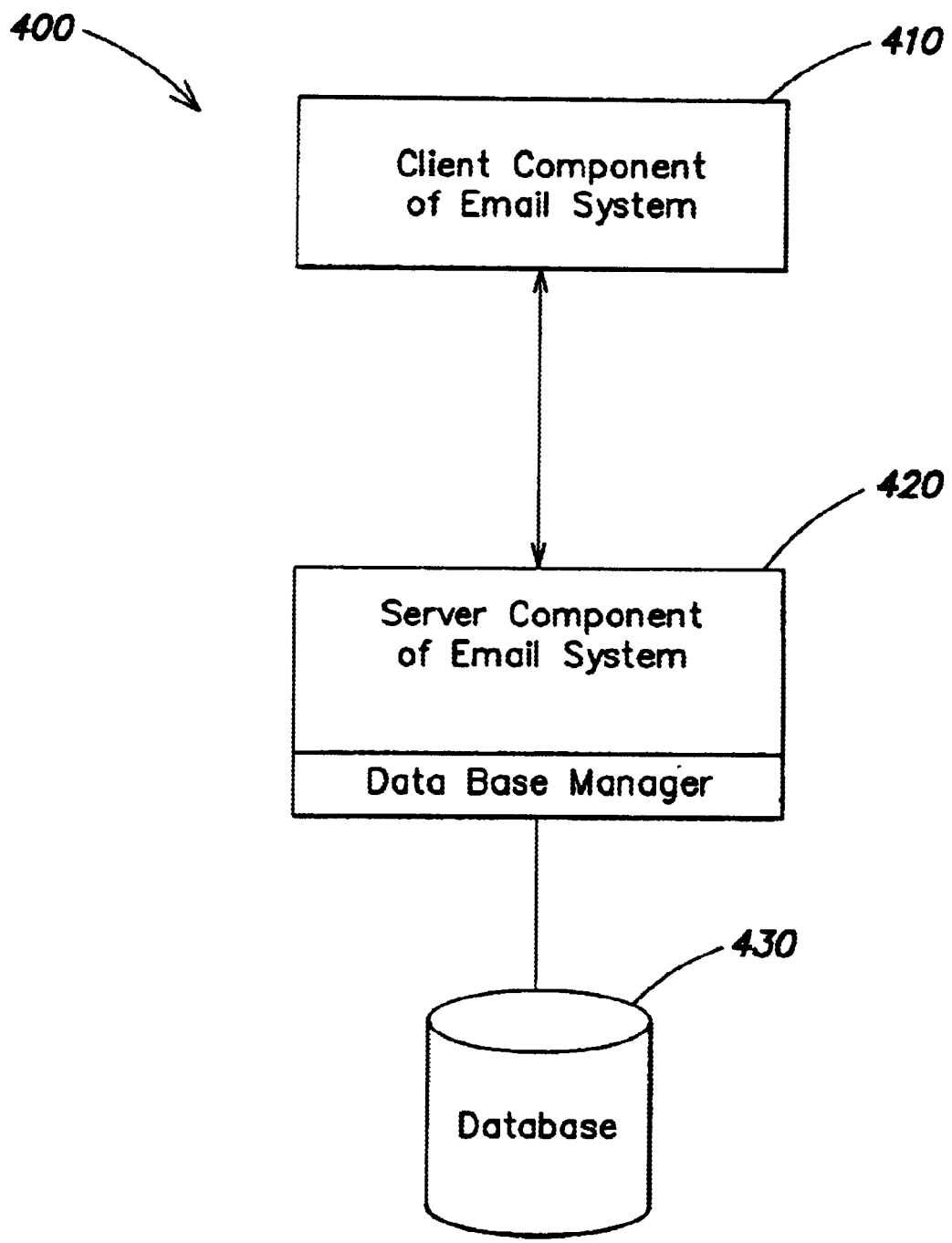
FIG. 4 shows an email system, according to the present invention.

The email system 400 of the present invention, as shown in FIG. 4, is installed as two software components. Email system 400 has a client component 410 that is installed on client system 10 and client system 20 and a server component 420 that is installed on server system 40. The client component 410 and the server component 420 communicate in a cooperative manner to send and receive email. At the time of installation of the email system 400, the permissible email interactions are defined for each user of the system, and UI 300 is generated. As earlier described, UI 300 is a list of possible email interactions, which represent a sender and recipient pair. For each interaction an email address is generated by the email system 400 that is a proxy address for sending an email to a recipient from the sender. There is a separate email address generated for each sender and recipient pair. The generated email may be unique or a common email address, used by a group of senders. The proxy email address corresponds to the recipient's actual email address, but is different from the actual email address. In one embodiment of the invention, the proxy address is in the form of "proxyid@serversystem.ext", where serversystem corresponds to server system 40.

Continuing with our example in which the project member represented by object 325 desires to send email to the project leader represented by object 305, a proxy email address is generated such as xx12789@serversystem.ext that identifies that the email message for the project leader was originated by the particular project member. The email is next routed to server system 40 where software residing on server system 40 determines that the email address xx12789@serversystem.ext is to be mapped into the recipient's actual email address and forwarded on to the recipient.

Still referring to FIG. 4, server system 40 is coupled to a storage element 230 for storing a database 430 of the proxy addresses for each sender recipient pair. Database 430 is maintained and managed by a Database Manger, residing as software on server system 40. As was previously explained, at installation of the email system the sender and recipient pairs are described and a proxy email address is generated in database 430 that represents the pairing. The sender and recipient pairs may also be updated after installation by adding a new pairing to database 430 or deleting an existing pair from database 430. If a new pair is added, the corresponding UI 300 is also updated at the client systems to reflect the new pairing. Conversely, if a pair is deleted, the corresponding hierarchical interaction is eliminated from the appropriate UI 300 at the client systems. Computer software residing at server system 40 performs the update and modification process, and the client systems are notified of the changes to the database 430 by server system 40.

In one embodiment of the invention, a proxy email address, corresponding but not equivalent to the actual email of the sender, may be presented to the recipient for replying to the email message. Consequently, a reply is transmitted from the recipient to the original sender using the supplied proxy email address rather than the actual email address of the sender. The proxy email address is converted to the actual email address of the original sender at server system 40 through a lookup of database 430.

While it is typical for a sender to welcome a reply from a recipient to an email, in certain circumstances this may not be the case and thus a reply is not provided for. If this is the situation no return email address, proxy or otherwise, is provided to the recipient.

Figure 5:
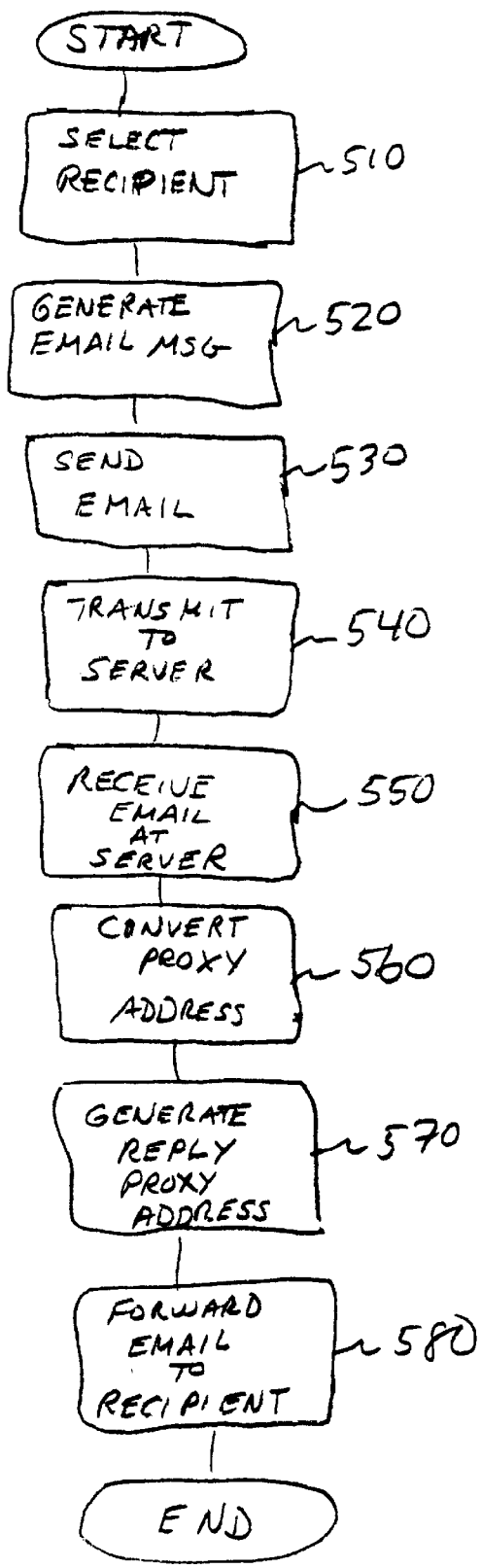
FIG. 5 depicts a flow chart of the process for transmitting email messages according to the invention.

FIG. 5 shows the process steps of sending email according to the present invention. In step 510, the intended sender of the email selects at client system 10 the recipient by interacting with UI 300, and in step 520 the message to be sent is generated. It will be easily recognized by one of ordinary skill in the art that the message may be created before the recipient is selected, and that the flow chart described herein is for the purposes of illustration of one embodiment of the invention. Other embodiments exist that are clearly contemplated to be within the scope of the invention. When the email is sent as shown at step 530, a proxy email address, identifying the sender and recipient pair, is transmitted to the server system 40 at step 540. After receiving at server system 40 the email request with the proxy address of the recipient as indicated in step 550, server system 40 in step 560 accesses database 430 to convert the proxy address of the recipient into the actual email address of the recipient. If the sender has authorized a reply to the email, a return address is generated in step 570 that is a proxy email address corresponding to but not equivalent with the sender's actual email address. This return email address is to be received by server system 40, and converted to the sender's actual email address. In step 580, the email message is forwarded to the recipient using the recipient's actual email address rather than the originally generated proxy address.

Because of the architecture of the presently described email system, numerous capabilities can be integrated into the system, which are not possible or are difficult to attain with conventional email systems. For example, in one embodiment of the invention, the organizational hierarchy, such a project name or department name associated with UI 300, from which the email originated may be encoded by server system 40 into the email message and passed to the recipient as an indication of the subject matter of the email. In one statement of the invention, the proxy email address is used to embed relational data concerning the sender and recipient into the email message. This relational data may consist of organizational data, project data, or any other information that defines the relationship of the sender and recipient. This capability permits the recipient to filter the email messages, according to subject matter or project or the like.

In a further embodiment of the invention, server system 40 may redirect the email of a recipient to different email devices in response to the proxy address that is used. For example, server system 40 may direct high priority messages, which are associated with certain predetermined proxy addresses, to an email pager, a telephone, or another electronic network and lower priority messages to the standard email device of the recipient. Since priority is associated with the proxy email address, the priority is easily changed by changing the database entry in database 430 for the proxy address. This flexibility provides for a dynamic routing capability for email that is selective according to the relationship between the sender and recipient.

As was previously discussed, the email system permits a flexible reconfiguration of the email system without altering the permanent email addresses of the users. For example, if a proxy address is deleted from database 430 the associated object relationship is thus eliminated from UI 300, and the ability to send email to the recipient under this hierarchy is terminated. Furthermore, if a proxy address is disabled in database 430 the associated object relationship is suspended, and the ability to send email to the recipient under this hierarchy is also suspended. These capabilities permit flexibility as projects end or the organization is restructured.

In another practice of the invention, the database entry for the recipient's proxy email address includes a counter, which can be incremented or decremented in order to limit the number of email exchanges for the proxy email address.

In general the architecture of the present invention allows for a flexible and efficient approach to customizing an email system to the needs of an organization, while providing additional information and security. In the most general statement of the invention, the proxy email address for the recipient is received at the server system 40 and the proxy email address is a trigger for an event to be performed by the server system 40. This event, in one instance, is the email system described herein, but other applications are possible. For example, the server system, upon recognizing a specific proxy email address, may produce a letter for actual mailing of the email message to the recipient through the postal system. The database 430, in this instance, contains the mailing address of the recipient.

Having described the invention, it should be apparent to those of ordinary. skill in the art that the foregoing is illustrative and not limiting. Numerous modifications and other embodiments are within the scope of one of ordinary skill in the art and are contemplated as falling within the scope of the invention as defined by the appended claims.

We claim:

1. An email system, operable on a computer system, for delivering an email message from a sender to a recipient, as identified by a sender and recipient pairing, comprising:

a user interface defining one or more said sender and recipient pairings, each of said pairings corresponding to a proxy email address that is distinct from the email address of said recipient, and being individually selectable;

wherein said email message is delivered to said proxy email address in response to selecting one of said sender and recipient pairings.

2. The email system of claim 1 wherein said user interface is structured as a hierarchical tree.

3. The email system of claim 2 wherein said hierarchical tree represents an organizational structure.

4. The email system of claim 1 further including:

a converter for converting said proxy email address to said recipient's email address; and a fowarder for forwarding said email message in response to said recipient's email address.

5. The email system of claim 4 wherein said converter is coupled to a database, having for each said sender and recipient pairing an entry describing said proxy email address.

6. The email system of claim 5 wherein said database further includes for each said sender and recipient pairing a second proxy email address identifying a response email address for said recipient.

7. The email system of claim 6 wherein said second proxy email address is different than the email address of said sender.

8. The email system of claim 4 wherein said converter includes embedding relationship data in said email message in response to said proxy email address.

* * * * *